United States Patent
Kita et al.

(10) Patent No.: US 12,294,114 B2
(45) Date of Patent: May 6, 2025

(54) FLEXIBLE FLAT CABLE INCLUDING PROTECTIVE ELEMENT IN MIDDLE OF CONDUCTIVE WIRE COVERED BY INSULATING SHEET, BATTERY MODULE HAVING THE SAME, AND METHOD FOR MANUFACTURING THE SAME

(71) Applicant: SANYO Electric Co., Ltd., Osaka (JP)

(72) Inventors: Hiroaki Kita, Osaka (JP); Hiroyuki Mihara, Osaka (JP); Tisato Magara, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 853 days.

(21) Appl. No.: 17/256,472

(22) PCT Filed: Jul. 8, 2019

(86) PCT No.: PCT/JP2019/026966
§ 371 (c)(1),
(2) Date: Dec. 28, 2020

(87) PCT Pub. No.: WO2020/013121
PCT Pub. Date: Jan. 16, 2020

(65) Prior Publication Data
US 2021/0234239 A1    Jul. 29, 2021

(30) Foreign Application Priority Data

Jul. 10, 2018    (JP) ................. 2018-130399

(51) Int. Cl.
*H01M 50/502* (2021.01)
*H01B 7/08* (2006.01)
(Continued)

(52) U.S. Cl.
CPC ............ *H01M 50/502* (2021.01); *H01B 7/08* (2013.01); *H01M 10/425* (2013.01);
(Continued)

(58) Field of Classification Search
CPC ............ H01M 50/502; H01M 50/209; H01M 50/569; H01M 10/429; H01M 10/48; H01M 10/482; H01B 7/08
(Continued)

(56) References Cited

U.S. PATENT DOCUMENTS

2005/0141164 A1* 6/2005 Bender ................ H01H 85/046
361/104
2011/0024205 A1* 2/2011 Nishihara ............. H01M 10/48
429/90

(Continued)

FOREIGN PATENT DOCUMENTS

JP          6-290642      10/1994
JP          H8-249932 A    9/1996
(Continued)

OTHER PUBLICATIONS

Butterfield, Andrew, and John Szymanski. "multilayer PCB." In A Dictionary of Electronics and Electrical Engineering. : Oxford University Press, 2018. https://www.oxfordreference.com/view/10.1093/acref/9780198725725.001.0001/acref-9780198725725-e-3102. (Year: 2018).*

(Continued)

*Primary Examiner* — Sean P Cullen
(74) *Attorney, Agent, or Firm* — WHDA, LLP

(57) ABSTRACT

Protective element-mounted flexible flat cable includes a plurality of conductive wires, insulating sheet covering the plurality of conductive wires, and protective element that is disposed in the middle of at least one of conductive wires and limits an overcurrent flowing through the at least one of conductive wires.

8 Claims, 7 Drawing Sheets

(51) Int. Cl.
*H01M 10/42* (2006.01)
*H01M 10/48* (2006.01)
*H01M 50/209* (2021.01)
*H01M 50/264* (2021.01)
*H01M 50/569* (2021.01)

(52) U.S. Cl.
CPC ......... *H01M 10/48* (2013.01); *H01M 10/482* (2013.01); *H01M 50/209* (2021.01); *H01M 50/569* (2021.01); *H01M 2010/4271* (2013.01); *H01M 50/264* (2021.01)

(58) Field of Classification Search
USPC .................................. 429/149, 156, 158, 160
See application file for complete search history.

(56) References Cited

U.S. PATENT DOCUMENTS

| | | | |
|---|---|---|---|
| 2018/0086472 A1* | 3/2018 | Gore | H01M 50/284 |
| 2018/0192511 A1* | 7/2018 | Tsumagari | H01H 85/046 |
| 2018/0219204 A1* | 8/2018 | Takase | H01M 50/581 |

FOREIGN PATENT DOCUMENTS

| | | | | |
|---|---|---|---|---|
| JP | 9-073819 | | 3/1997 | |
| JP | 2017011191 A | * | 1/2017 | |
| JP | 2017-027831 | | 2/2017 | |
| JP | 2017027831 A | * | 2/2017 | ............ H01M 10/48 |
| JP | 2017-098038 | | 6/2017 | |

OTHER PUBLICATIONS

Bel Fuse Inc., Type C1H High Current Rated Fast Acting Chip Fuse, 2023, Bel Power solutions & Protection (Year: 2023).*
Bedoya-Pinto et al., Flexible spintronic devices on Kapton, 2014, Applied Physics Letters, 104, 602412 (Year: 2014).*
"Monolithic." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1268941. (Year: 2010).*
Merriam-Webster.com Dictionary, s.v. "monolithic," accessed Oct. 3, 2024, https://www.merriam-webster.com/dictionary/monolithic. (Year: 2024).*
International Search Report of PCT application No. PCT/JP2019/026966 dated Oct. 1, 2019.

* cited by examiner (A)

(B)

FLEXIBLE FLAT CABLE INCLUDING PROTECTIVE ELEMENT IN MIDDLE OF CONDUCTIVE WIRE COVERED BY INSULATING SHEET, BATTERY MODULE HAVING THE SAME, AND METHOD FOR MANUFACTURING THE SAME

CROSS-REFERENCE TO RELATED APPLICATIONS

This application is a U.S. national stage application of the PCT International Application No. PCT/JP2019/026966 filed on Jul. 8, 2019, which claims the benefit of foreign priority of Japanese patent application No. 2018-130399, filed on Jul. 10, 2018, the contents all of which are incorporated herein by reference.

TECHNICAL FIELD

The present invention relates to a protective element-mounted flexible flat cable, a battery module, and a method for manufacturing a protective element-mounted flexible flat cable.

BACKGROUND ART

As a power source that is used, for example, for a vehicle and is required to output a high output voltage, there is known a battery module configured with a plurality of series-connected battery cells. In a battery module, neighboring cells are electrically connected with each other via a bus bar. In addition, a voltage sense line is attached to each bus bar to detect a voltage between the cells. This arrangement makes it possible to detect a voltage abnormality between the cells. As the voltage sense lines, a flexible printed circuit board (FPC), electric wires, or the like is generally used.

In the above structure, if the voltage sense lines are short-circuited, the cells connected to the short-circuited voltage sense lines may be short-circuited. To address this issue, for example, Patent Literature 1 proposes a battery wiring module in which thermistors, chip fuses, or the like are provided in the middle of voltage sense lines formed on an FPC.

CITATION LIST

Patent Literature

PTL 1: Unexamined Japanese Patent Publication No. 2017-27831

SUMMARY OF THE INVENTION

As the battery module capacity increases, the battery module cost required to be further reduced. To meet this requirement, the inventors of the present invention have studied reduction in cost of the voltage sense lines. Then, the inventors of the present invention have conceived a new technique that can achieve the reduction in occurrence of a short circuit between cells via the voltage sense lines and, at the same time, the reduction in cost of the voltage sense lines.

The present invention has been made in view of the above situation, and an object of the present invention is to provide a technique for reducing occurrence of a short circuit between cells via voltage sense lines and for reducing the cost of the voltage sense lines.

Solutions to Problem

One aspect of the present invention is a protective element-mounted flexible flat cable. The flexible flat cable includes: a plurality of conductive wires; an insulating sheet covering the plurality of conductive wires; and a protective element that is disposed in a middle of at least one of the conductive wires and limits an overcurrent flowing through the at least one of the conductive wires.

Another aspect of the present invention is a battery module. The battery module includes: a cell stack having a plurality of stacked cells; and a protective element-mounted flexible flat cable in the above-mentioned aspect, which constitutes voltage sense lines for sensing the voltage of each cell.

Another aspect of the present invention is a method for manufacturing a protective element-mounted flexible flat cable. The manufacturing method includes: forming an opening in a predetermined area on a flexible flat cable including: a plurality of conductive wires; and an insulating sheet covering the plurality of conductive wires, by cutting away the conductive wire and the insulating sheet; disposing, in the opening, a protective element that limits an overcurrent flowing through the conductive wire; and connecting the conductive wire and the protective element.

Another aspect of the present invention is a method for manufacturing a protective element-mounted flexible flat cable. The manufacturing method includes: cutting away, in a predetermined area on a flexible flat cable including: a plurality of conductive wires; and an insulating sheet covering the plurality of conductive wires, a part of the conductive wire and the insulating sheet to make a part of the conductive wire remaining in the predetermined area a protective element that limits an overcurrent flowing through the conductive wire.

Note that any combinations of the above-described structural components are valid as aspects of the present invention; and if expressions of the present invention are converted between method, device, system, and the like, the converted expressions are also valid as aspects of the present invention.

Advantageous Effect of Invention

The present invention makes it possible to reduce occurrence of a short circuit between cells via voltage sense lines and to reduce the cost of the voltage sense lines.

DESCRIPTION OF EMBODIMENTS

Figure 1:
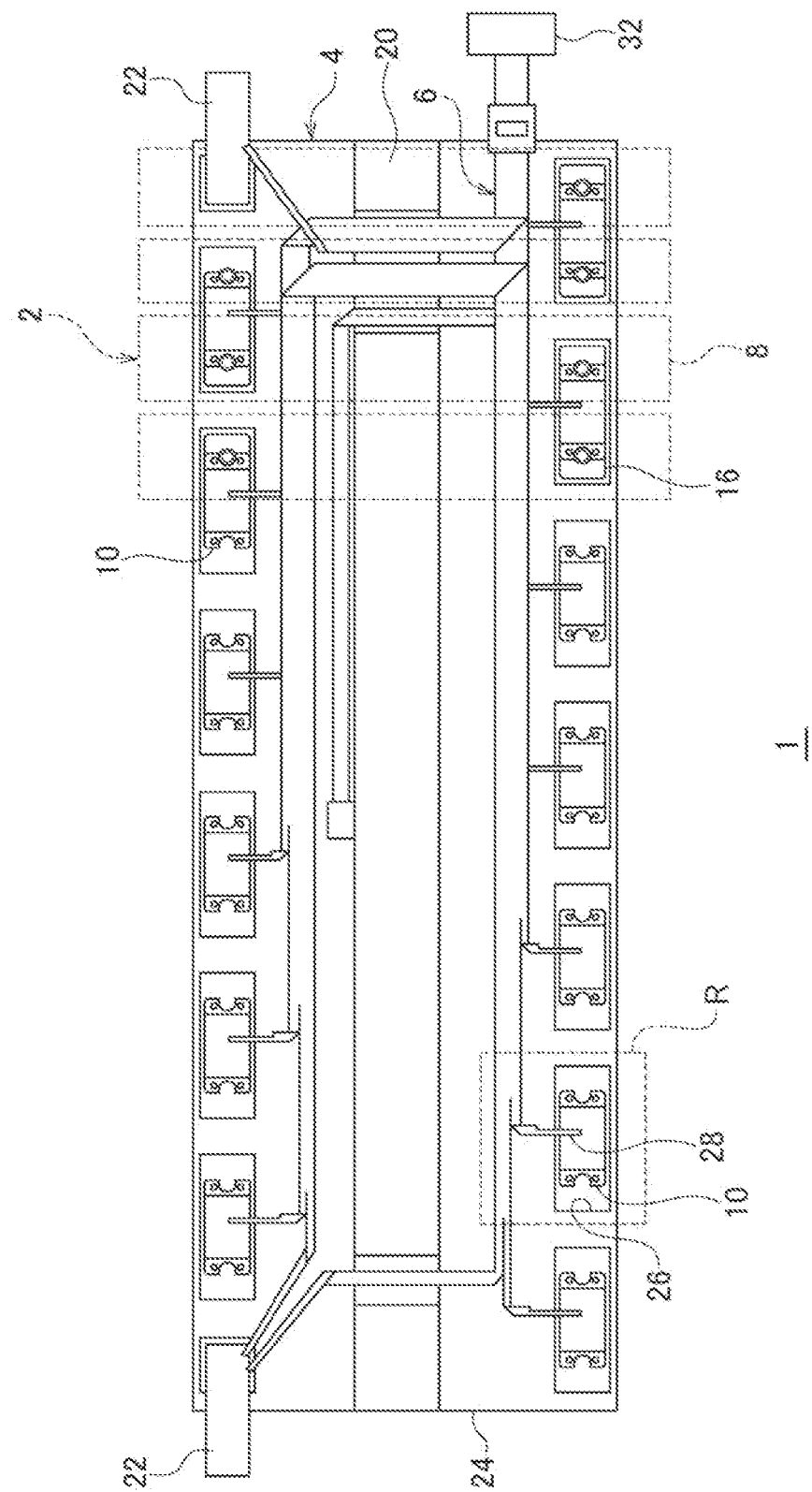
FIG. 1 is a plan view showing a schematic structure of a battery module according to a first exemplary embodiment.

In the following, the present invention will be described on the basis of preferred exemplary embodiments with reference to the drawings. The exemplary embodiments do not limit the invention but are just examples; therefore, not all features described in the exemplary embodiments and combinations of the features are necessarily essential to the invention. The same reference marks are assigned to the same or equivalent components, members, and processes shown in the drawings, and a redundant description will be omitted. Further, scales and shapes of the parts shown in the drawings are determined for descriptive purposes, and the scales or shapes should not be interpreted as limitation unless otherwise mentioned. Further, when terms such as "first" and "second" are used in the present specification or the claims, these terms do not represent any order or importance unless otherwise mentioned, but these terms are used to distinguish one component from the other components. Further, a part of the members that are not important to describe the exemplary embodiments are not displayed in the drawings.

First Exemplary Embodiment

Figure 2:
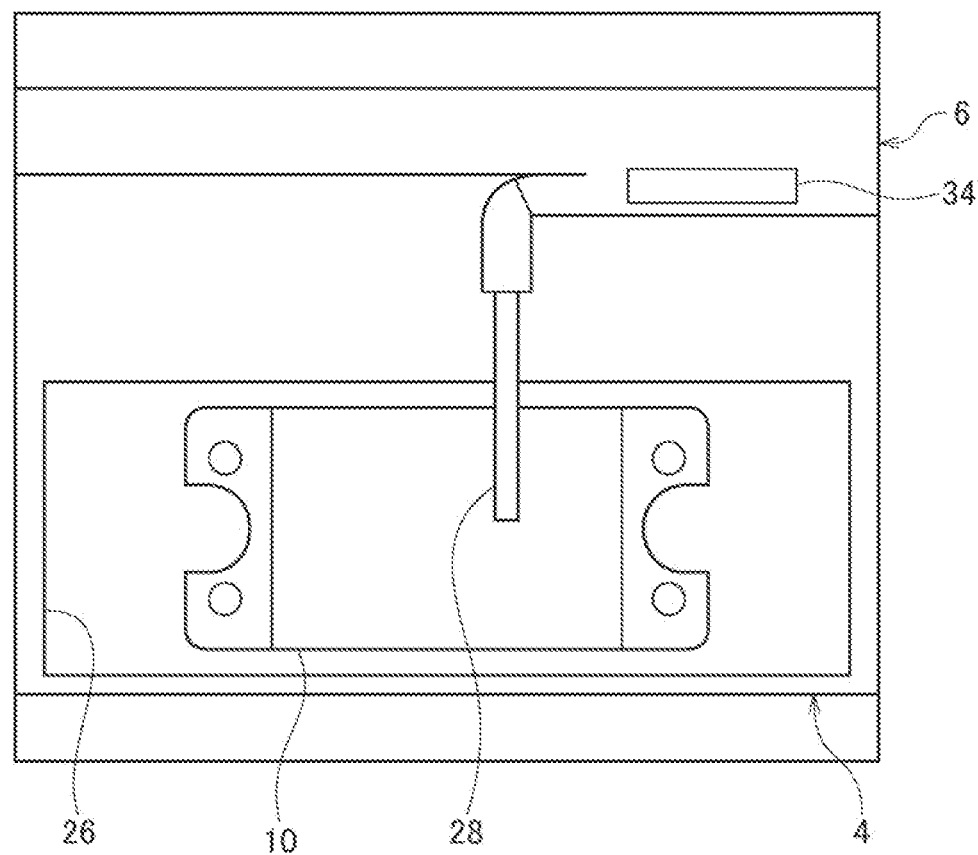
FIG. 2 is an enlarged plan view showing a region including a bus bar in the battery module.
Figure 3:
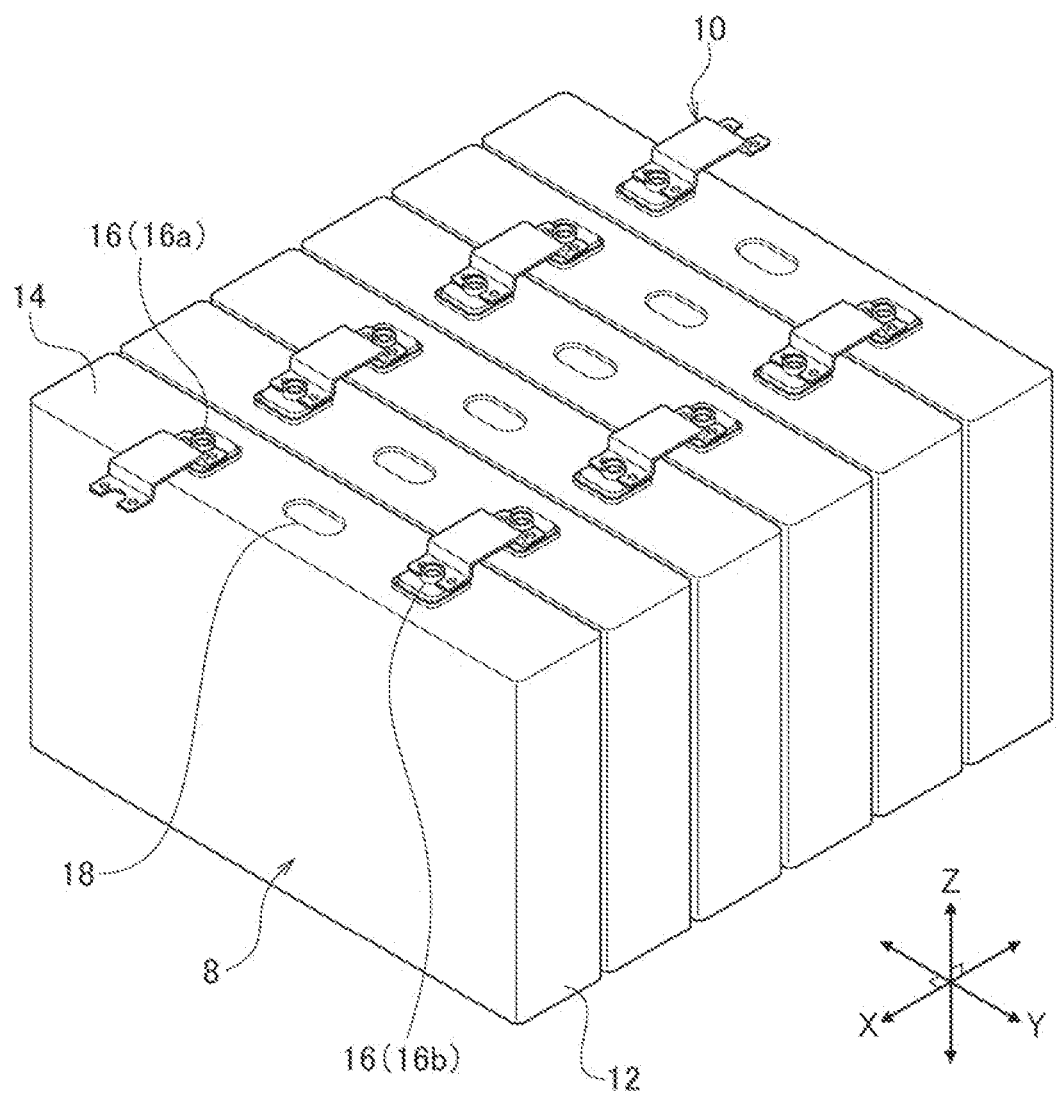
FIG. 3 is a partial perspective view of a schematic structure of a cell stack.

FIG. 1 is a plan view showing a schematic structure of a battery module according to a first exemplary embodiment. FIG. 2 is an enlarged plan view showing a region including a bus bar in the battery module. FIG. 3 is a partial perspective view of a schematic structure of a cell stack. Note that, in FIG. 1, only some cells in the cell stack are shown by a broken line. Further, protective elements are not shown. FIG. 2 is an enlarged view of broken line region R in FIG. 1, and cells 8 are not shown.

Battery module 1 includes cell stack 2, bus bar plate 4, and protective element-mounted flexible flat cable 6. Hereinafter, protective element-mounted flexible flat cable 6 is referred to as protective element-mounted FFC 6.

Cell stack 2 has a plurality of stacked cells 8 and bus bars 10 that electrically connects cells 8. Cells 8 are each a rechargeable secondary battery such as a lithium ion battery, a nickel-metal-hydride battery, or a nickel-cadmium battery. Cell 8 is a so-called prismatic battery, and has outer jacket 12 having a flattened rectangular parallelepiped shape. A substantially rectangular opening (not shown) is formed in one surface of outer jacket 12. An electrode body, an electrolyte, and the like are put into outer jacket 12 through this opening. On the opening of outer jacked 12, there is provided sealing plate 14 to seal outer jacket 12.

On sealing plate 14, positive output terminal 16 is provided near one end in a longitudinal direction, and negative output terminal 16 is provided near the other end. Hereinafter, positive output terminal 16 is referred to as positive-electrode terminal 16a, as appropriate, and negative output terminal 16 is referred to as negative-electrode terminal 16b, as appropriate. Further, when there is no need to distinguish the polarity of output terminals 16, positive-electrode terminal 16a and negative-electrode terminal 16b are collectively referred to as output terminals 16. Outer jacket 12, sealing plate 14, and output terminals 16 are conductor and are made of, for example, metal.

In the present exemplary embodiment, the side of cell 8 where sealing plate 14 is provided is a top surface of cell 8, and the opposite side is a bottom surface of cell 8. Further, cell 8 has two main surfaces each connecting the top surface and the bottom surface to each other. The main surfaces are surfaces having the largest area among the six surfaces of cell 8. The remaining two surfaces other than the top surface, the bottom surface, and the two main surfaces are side surfaces of cell 8. Further, a top surface side of cells 8 is assumed as a top surface of cell stack 2, and a bottom surface side of cells 8 is assumed as a bottom surface of cell stack 2. For the sake of convenience, the top surface side of cell stack 2 is assumed as a vertically upward direction (i.e., upward along axis Z in FIG. 3), and the bottom surface side of cell stack 2 is assumed as a vertically downward direction (i.e., downward along axis Z in FIG. 3).

Sealing plate 14 is provided with safety valve 18 between the pair of output terminals 16. Safety valve 18 is configured to open when an internal pressure of outer jacket 12 rises to a predetermined value or higher so that a gas inside the outer jacket can be released. The safety valves 18 of cells 8 are connected to gas duct 20 of bus bar plate 4, and exhaust gases discharged from safety valves 18 are discharged to gas duct 20.

The plurality of cells 8 are stacked with predetermined intervals in such a manner that the main surfaces of neighboring cells 8 are opposed to each other. Note that the expression "stack" means arranging a plurality of members in any one direction. Therefore, stacking of cells 8 also includes arranging the plurality of cells 8 horizontally. Further, cells 8 are arranged such that output terminals 16 face the same direction (the vertically upward direction in this exemplary embodiment, for the sake of convenience). Neighboring two cells 8 are stacked such that positive-electrode terminal 16a of one cell 8 is adjacent to negative-electrode terminal 16b of other cell 8. Positive-electrode terminal 16a and negative-electrode terminal 16b are electrically connected via bus bar 10. Note that, in some cases, output terminals 16, of the same polarity, of the plurality of neighboring cells 8 may be parallel-connected with bus bars 10 to form cell blocks, and the cell blocks may be series-connected.

Bus bars 10 are each an approximately belt-shaped metal member. One end side of bus bar 10 is electrically connected to positive-electrode terminal 16a of one cell 8, and the other end side is electrically connected to negative-electrode terminal 16b of the other cell 8. Note that when the above-mentioned cell block is formed, positive-electrode terminals 16a or negative-electrode terminals 16b are electrically connected to each other by bus bar 10 in the cell block. Further, external connection terminals 22 are connected to cells 8 on the outer most sides. External connection terminals 22 are electrically connected to output terminals 16 that function as terminal ends of series-connected cells 8. External connection terminals 22 are connected to an external load via connecting wires routed to the outside of cell stack 2.

Cell stack 2 has a plurality of separators (not shown). The separator is also referred to as an insulating spacer and is made of, for example, a resin having insulation properties. The separators are each disposed between each cell 8 and between cell 8 and each end plate to be described later. This arrangement insulates between outer jackets 12 of neighboring cells 8. Further, outer jacket 12 of cell 8 and each end plate are insulated from each other.

Cell stack 2 is sandwiched by a pair of end plates (not shown). Each end plate is disposed adjacent to one of outermost cells 8. The end plates are made of metal plates, for example. Cell stack 2 and the pair of end plates are restrained by a pair of restraining members (not shown). The pair of restraining members are also referred to as bind bars. The pair of restraining members are arranged in a horizontal direction Y perpendicular to a stacking direction X of the plurality of cells 8. Restraining members each have: a first part extending in the stacking direction X of cells 8; and two second parts each extending from one of both end parts of the first part to the cell stack 2 side. The two second parts face each other in the stacking direction X. Restraining members each can be formed by bending the end parts of a metal plate, for example.

By fixing the two second parts and the pair of end plates by screwing or other methods, the plurality of cells 8 and the plurality of separators are fastened by the pair of end plates and the pair of restraining members. The separators, the end plates, and the restraining members have known structures; therefore, further detailed description will not be given.

Cell stack 2 is stacked with bus bar plate 4 that covers the top surface of cell stack 2. Bus bar plate 4 has plate-shaped main body part 24, a plurality of openings 26, and gas duct 20. The plurality of openings 26 and gas duct 20 are provided in main body part 24. The plurality of openings 26 are provided at positions where openings 26 overlap respective output terminals 16 and bus bars 10. With this arrangement, output terminals 16 and bus bars 10 are exposed. Gas duct 20 is provided at a position where gas duct 20 overlaps each safety valve 18. Bus bar plate 4 is made of, for example, a resin having insulation properties.

Protective element-mounted FFC 6 is placed on bus bar plate 4. Protective element-mounted FFC 6 of the present exemplary embodiment constitutes voltage sense lines that are connected to cell stack 2 having the plurality of stacked cells 8 and sense the voltage of each cell 8. Details will be described later, but protective element-mounted FFC 6 is structured such that a plurality of conductive wires 28 are covered with insulating sheet 30 (see FIGS. 4A, 4B and other drawings). One end of each conductive wire 28 is connected to one of bus bars 10 to constitute a voltage sense line. A part of conductive wires 28 are connected to external connection terminals 22.

Specifically, a part of each conductive wire 28 is cut off in accordance with a position of corresponding bus bar 10 to adjust the length. Next, insulating sheet 30 at a tip of each conductive wire 28 is removed. Then, the exposed tips of conductive wires 28 are connected to bus bars 10 by welding or other methods. The other ends of conductive wires 28 are connected to connector 32. Connector 32 is connected to an external battery electronic control unit (ECU) (not shown) or the like. The battery ECU controls sensing of the voltage of each cell 8 and the like and controls charging and discharging of each cell 8, and the like.

Figure 4:
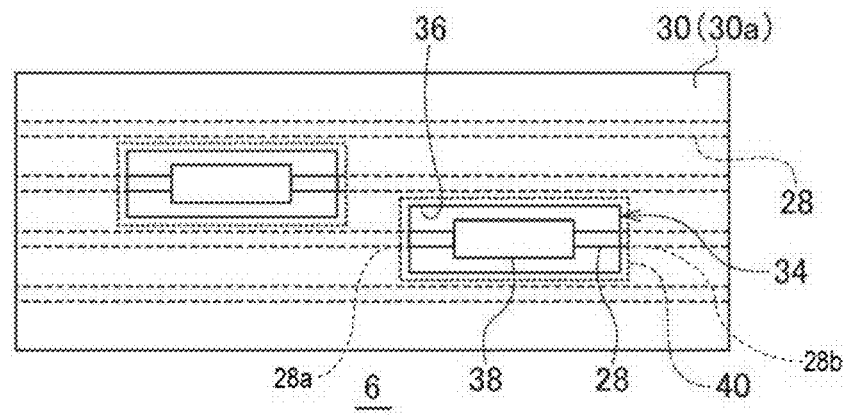
FIG. 4A is a plan view schematically showing a part of a protective element-mounted FFC.
FIG. 4B is a plan view schematically showing the protective element-mounted FFC when an upper-side insulating sheet is removed.
Figure 4:
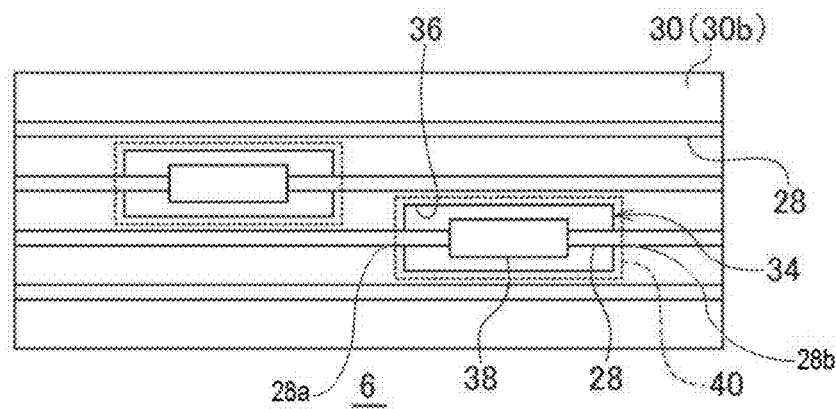

Further, protective element-mounted FFC 6 has protective element 34 in the middle of each conductive wire 28. As shown in FIG. 2, protective element 34 is preferably disposed in the vicinity of the tip of conductive wire 28, in other words, disposed in the vicinity of bus bar 10. In the following, a structure of protective element-mounted FFC 6 will be described in detail. FIG. 4A is a plan view schematically showing a part of a protective element-mounted FFC. FIG. 4B is a plan view schematically showing the protective element-mounted FFC when an upper-side insulating sheet is removed.

Protective element-mounted FFC 6 includes: the plurality of conductive wires 28; insulating sheet 30 covering the plurality of conductive wires 28; and protective elements 34. The plurality of conductive wires 28 are arranged to extend parallel to each other and covered with insulating sheet 30. Each conductive wire 28 is made of a flat metal wire such as a belt-shaped flat copper wire.

Insulating sheet 30 includes upper-side insulating sheet 30a disposed on the upper side of conductive wires 28 and lower-side insulating sheet 30b disposed on the lower side of conductive wires 28. The plurality of conductive wires 28 are insulated from the outside, being sandwiched by upper-side insulating sheet 30a and lower-side insulating sheet 30b. Further, conductive wires 28 are also insulated from each other by insulating sheet 30. Insulating sheet 30 is made of an insulating resin such as polyvinyl chloride, polyimide, or polyethylene naphthalate.

Protective elements 34 are disposed in the middle of individual conductive wires 28 (e.g., a protective element 34 may be disposed between a first portion 28a and a second portion 28b of a conductive wire 28 as described in FIGS. 4(A) and 4(B)) to limit an overcurrent continuously flowing through conductive wires 28. Protective element 34 of the present exemplary embodiment has current limiting element 38 and substrate 40 where current limiting element 38 is placed. Current limiting element 38 is configured with a conventionally known element such as a fuse or a thermistor. Substrate 40 is a printed wiring board, and electrodes of current limiting element 38 are connected to connecting wires on substrate 40. Note that substrate 40 may be a flexible substrate such as a plastic film or may be a rigid substrate.

Upper-side insulating sheet 30a and lower-side insulating sheet 30b each have openings 36 in areas in each of which protective element 34 is disposed. In each opening 36, conductive wire 28, to which protective element 34 is to be connected, is cut, and cut end parts are exposed. Each protective element 34 is disposed such that current limiting element 38 overlaps opening 36. Then, current limiting element 38 is series-connected to conductive wire 28 exposed in opening 36. Conductive wire 28 is connected to the electrodes of current limiting element 38 via the connecting wires on substrate 40. Conductive wire 28, substrate 40, and current limiting element 38 can be connected by a known connection method such as soldering. Note that conductive wire 28 may be directly connected to the electrodes of current limiting element 38.

By series-connecting protective element 34 in the middle of conductive wire 28 constituting a voltage sense line, even when two of conductive wires 28 are short-circuited and an overcurrent flows between cells 8, protective element 34 can immediately cut off the overcurrent. In the case where current limiting element 38 is a thermistor, when an overcurrent flows through conductive wire 28, a resistance of the thermistor increases as the temperature of conductive wire 28 rises, and the overcurrent can therefore be cut off. In the case where current limiting element 38 is a fuse, an overcurrent flowing through conductive wire 28 fuses the fuse, and the overcurrent can therefore be cut off.

In the present exemplary embodiment, substrate 40 is fixed to insulating sheet 30. For example, substrate 40 has a dimension larger than the dimension of opening 36, so that a peripheral edge part of substrate 40 overlaps lower-side insulating sheet 30b. The peripheral edge part of substrate 40 is fixed to lower-side insulating sheet 30b, for example, with an adhesive.

A connection part of current limiting element 38, substrate 40, and conductive wire 28 may be covered with a protective member such as a silicone resin or an epoxy resin. For example, each opening 36 is entirely covered with a protective member.

[Method for Manufacturing Protective Element-Mounted Flexible Flat Cable]

Subsequently, a description will be given to a method for manufacturing the protective element-mounted flexible flat cable according to the present exemplary embodiment. FIGS. 5A to 5D are schematic diagrams each showing a step of the method for manufacturing the protective element-mounted FFC according to the first exemplary embodiment.

Figure 5A:
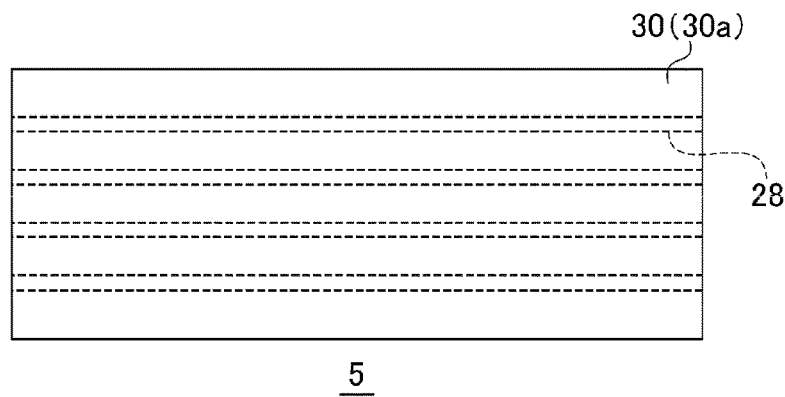
FIGS. 5A to 5D are schematic diagrams each showing a step of a method for manufacturing a protective element-mounted FFC according to the first exemplary embodiment.

First, as shown in FIG. 5A, flexible flat cable 5 is prepared that includes a plurality of conductive wires 28 and insulating sheet 30 covering the plurality of conductive wires 28. As flexible flat cable 5, it is possible to use a commercially available product where no protective element is mounted.

Figure 5B:
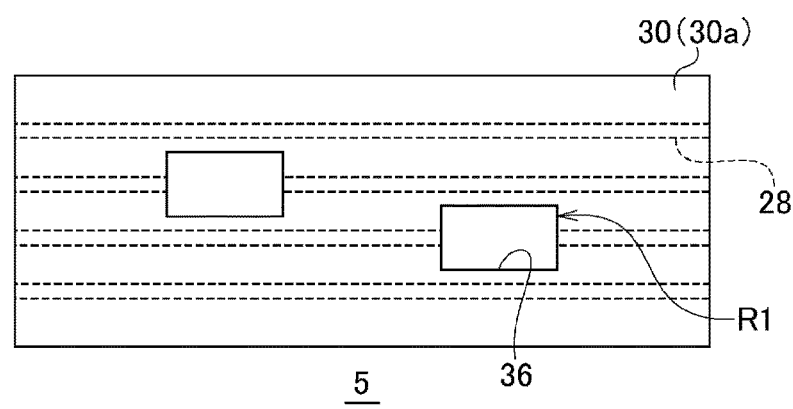

Next, as shown in FIG. 5B, conductive wires 28 and insulating sheet 30 are cut away in predetermined areas (first areas R1 in the present exemplary embodiment) on flexible flat cable 5. At this time, both of upper-side insulating sheet 30a and lower-side insulating sheet 30b are cut away. In this way, openings 36 are formed in first areas R1. In each opening 36, conductive wire 28 is completely cut off. Openings 36 can be formed by punching first areas R1, for example. Openings 36 are through-holes extending from one main surface to the other main surface of flexible flat cable 5.

Figure 5C:
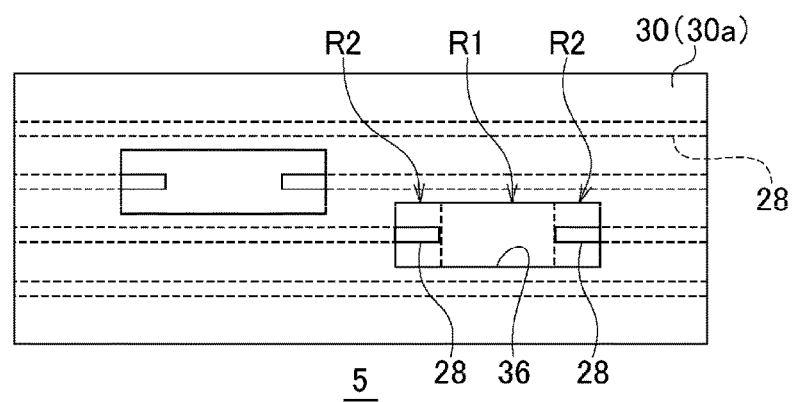

Next, as shown in FIG. 5C, insulating sheet 30 is cut away in second areas R2 in contact with respective first areas R1. This enlarges openings 36, so that the tips of the cut parts of conductive wire 28 are exposed in each second area R2. For example, laser machining or the like can be performed on second areas R2 to expand openings 36 while cutting away only insulating sheet 30 and leaving conductive wires 28.

Figure 5D:
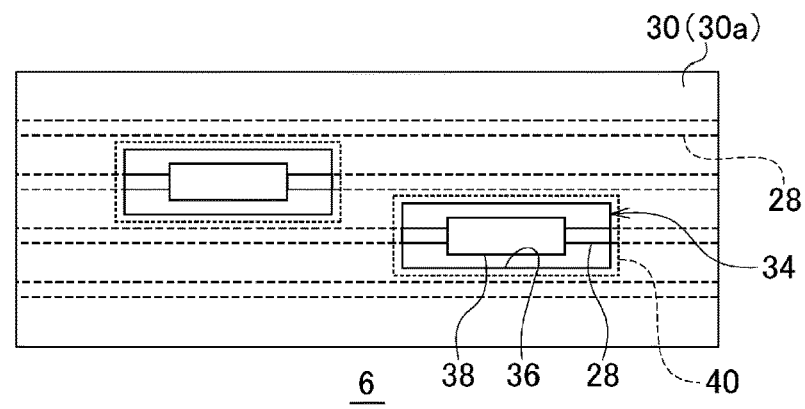

Next, as shown in FIG. 5D, protective element 34 that limits an overcurrent flowing through conductive wire 28 is disposed in each opening 36. Then, conductive wire 28 exposed in each second area R2 and protective element 34 are connected. Specifically, the connecting wires of each substrate 40 to which the electrodes of current limiting element 38 are connected are bonded to conductive wire 28 by soldering or other methods. In addition, the peripheral edge part of each substrate 40 and insulating sheet 30 are fixed to each other with an adhesive. Through the above steps, protective element-mounted FFC 6 is obtained.

As described above, protective element-mounted flexible flat cable 6 according to the present exemplary embodiment includes: the plurality of conductive wires 28; insulating sheet 30 covering the plurality of conductive wires 28; and protective elements 34 disposed in the middle of respective conductive wires 28 to limit overcurrents flowing through conductive wires 28. Then, protective element-mounted FFC 6 is connected to cell stack 2 to constitute the voltage sense lines.

An FPC is formed by adhering a metal foil on a film of polyimide or polyethylene naphthalate (PEN) and then etching the metal foil to form a wiring pattern. Therefore, when an FPC is used, a pattern for mounting protective elements can be formed in the manufacturing process. As a result, it is possible to easily manufacture an FPC where protective elements are mounted. However, in the case of FPC, the metal foil is lost largely through etching, which loss is a cause of increase in the cost of the voltage sense lines.

In contrast, in the case of protective element-mounted FFC 6 according to the present exemplary embodiment, where protective elements 34 are mounted on the FFC, no metal foil is lost unlike the case of FPC, so that the cost of the voltage sense lines can be reduced. In addition, because FFCs are thinner than electric wires, voltage sense lines can be downsized, and as a result, battery module 1 can be downsized. Further, by mounting protective elements 34, it is possible to reduce occurrence of a short circuit between cells via voltage sense lines. Therefore, a possibility of occurrence of smoke and fire also can be reduced.

Battery module 1 of the present exemplary embodiment includes cell stack 2 and protective element-mounted FFC 6 serving as voltage sense lines. This configuration can reduce the cost of battery module 1 and at the same time can improve safety of battery module 1.

The FFC is formed such that a plurality of conductive wires are sandwiched between a pair of insulating sheets. Therefore, it is conventionally difficult to form mounting areas for protective elements in the manufacturing process of the FFC. In contrast, the method for manufacturing protective element-mounted FFC 6 according to the present exemplary embodiment includes: forming openings 36 in predetermined areas on flexible flat cable 5 including: the plurality of conductive wires 28; and insulating sheet 30 covering conductive wires 28, by cutting away conductive wires 28 and insulating sheet 30; and disposing, in each opening 36, protective element 34 and connecting conductive wire 28 and protective element 34. This method can simplify the manufacturing process of protective element-mounted FFC 6.

Each protective element 34 has current limiting element 38 and substrate 40. Current limiting element 38 is connected to conductive wire 28. Since protective element 34 has substrate 40, it is possible to reduce decrease in strength, of protective element-mounted FFC 6, in the mounting area for protective element 34. Therefore, it is possible to reduce a load applied to the connection part of current limiting element 38 and conductive wire 28. Further, substrate 40 is fixed to insulating sheet 30. This configuration can further improve strength, of protective element-mounted FFC 6, in the mounting area for each protective element 34.

Second Exemplary Embodiment

Figure 6A:
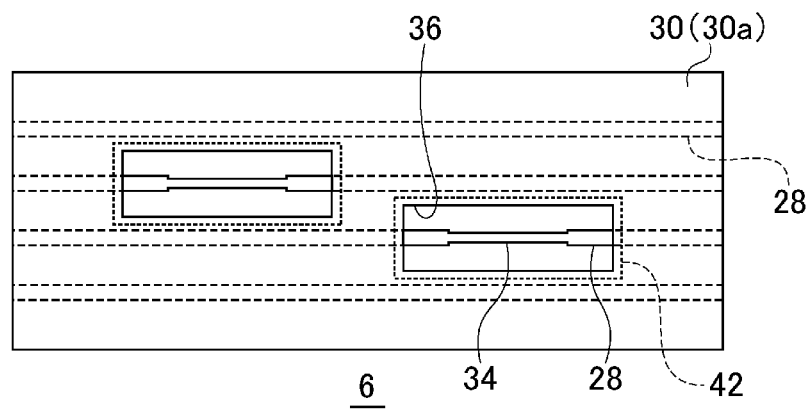
FIG. 6A is a plan view schematically showing a part of a protective element-mounted FFC according to a second exemplary embodiment.
Figure 6B:
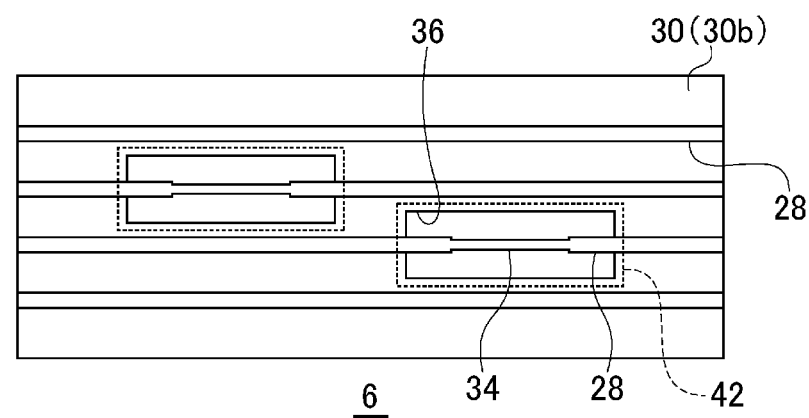
FIG. 6B is a plan view schematically showing the protective element-mounted FFC when an upper-side insulating sheet is removed.

A protective element-mounted FFC according to a second exemplary embodiment has the same configuration as the first exemplary embodiment except that the structure of the protective element and the mounting method on the flexible flat cable are different. In the following, with respect to the protective element-mounted FFC according to the present exemplary embodiment, a description will be given mainly on the configuration that is different from the first exemplary embodiment, but a description will be briefly given or will not be given on the same configuration. FIG. 6A is a plan view schematically showing a part of the protective element-mounted FFC according to the second exemplary embodiment. FIG. 6B is a plan view schematically showing the protective element-mounted FFC when an upper-side insulating sheet is removed.

Protective element-mounted FFC 6 includes: a plurality of conductive wires 28; insulating sheet 30 covering the plurality of conductive wires 28; and protective elements 34. The plurality of conductive wires 28 are covered with insulating sheet 30. Insulating sheet 30 includes upper-side insulating sheet 30a and lower-side insulating sheet 30b. Protective elements 34 are disposed in the middle of individual conductive wires 28 to limit an overcurrent continuously flowing through conductive wires 28.

Protective element 34 of the present exemplary embodiment is a part of conductive wire 28 and is configured with a part having a smaller cross-sectional area than the other part, in other words, configured with a small-width part. Protective element 34 has a smaller cross-sectional area than the other part of conductive wire 28. That is, conductive wire 28 has a small cross-sectional area as a current flow passage, at a part serving as protective element 34; therefore, protective element 34 has a higher resistance. Therefore, when an overcurrent flows through conductive wire 28, protective element 34 is fused. As a result, the overcurrent can be cut off. Upper-side insulating sheet 30a and lower-side insulating sheet 30b each have openings 36 in areas in each of which protective element 34 is disposed. The small-width part is formed on conductive wire 28 exposed in opening 36.

Protective element-mounted FFC 6 further includes substrates 42 that support protective elements 34. Each substrate 42 is a reinforcing plate that compensates decrease in the strength, of protective element-mounted FFC 6, in the mounting area for protective element 34. For this reason, substrate 42 is provided with no connecting wire. For example, substrate 42 has the same structure as substrate 40 of the first exemplary embodiment except that substrate 42 has no connecting wire.

In the present exemplary embodiment, substrates 42 are fixed to insulating sheet 30. For example, each substrate 42 has a dimension larger than the dimension of opening 36, so that a peripheral edge part of substrate 42 overlaps lower-side insulating sheet 30b. The peripheral edge part of substrate 42 is fixed to lower-side insulating sheet 30b, for example, with an adhesive. Protective element 34 may be covered with a protective member such as a silicone resin or an epoxy resin. For example, each opening 36 is entirely covered with a protective member.

[Method for Manufacturing Protective Element-Mounted Flexible Flat Cable]

Figure 7A:
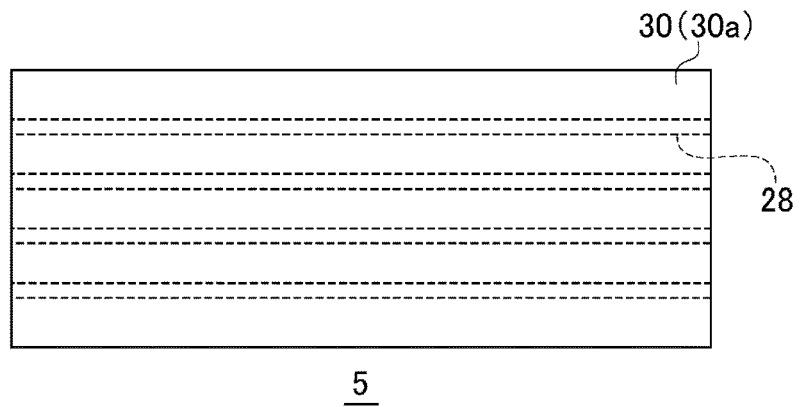
FIGS. 7A to 7C are schematic diagrams each showing a step of a method for manufacturing the protective element-mounted FFC according to the second exemplary embodiment.
Figure 7B:
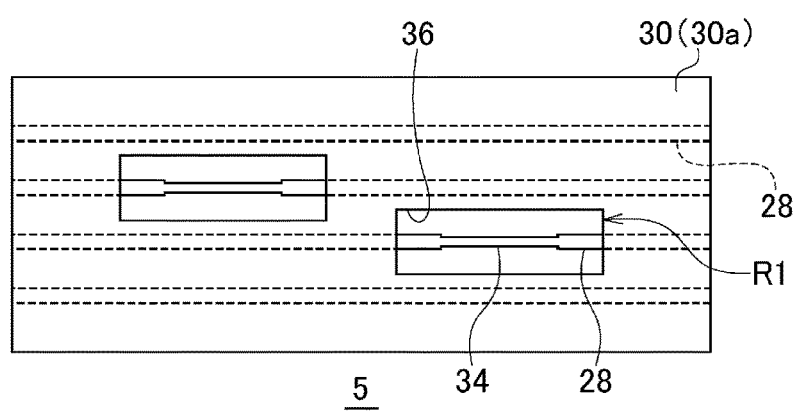
Figure 7C:
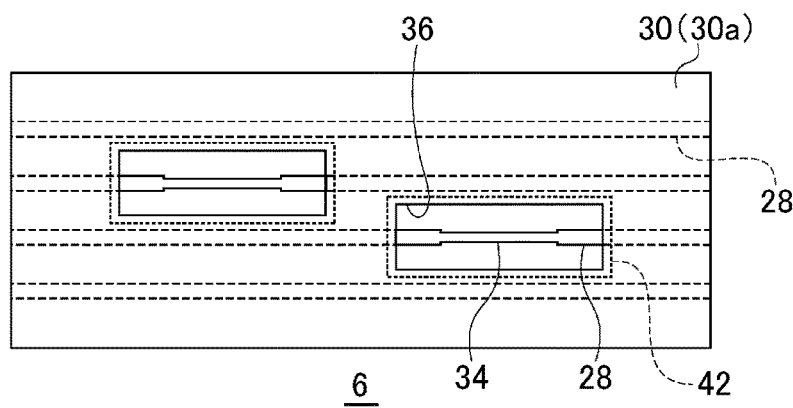

Subsequently, a description will be given to a method for manufacturing the protective element-mounted flexible flat cable according to the present exemplary embodiment. FIGS. 7A to 7C are schematic diagrams each showing a step of the method for manufacturing the protective element-mounted FFC according to the second exemplary embodiment.

First, as shown in FIG. 7A, flexible flat cable 5 is prepared that includes a plurality of conductive wires 28 and insulating sheet 30 covering the plurality of conductive wires 28. As flexible flat cable 5, it is possible to use a commercially available product where no protective element is mounted.

Next, as shown in FIG. 7B, parts of conductive wires 28 of flexible flat cable 5 and insulating sheet 30 are cut away in predetermined areas (first areas R1 in the present exemplary embodiment). At this time, a part of each conductive wire 28 is cut away such that a remaining part in first area R1 keeps a state where the remaining part connects from one end side (connector 32 side) to the other end side (bus bar 10 side) without any break.

In the present exemplary embodiment, both edge parts of conductive wire 28 are cut away along the direction in which conductive wire 28 extends. Note that only one edge part or a central part of conductive wire 28 may be cut away along the direction in which conductive wire 28 extends. The part of conductive wire 28 remaining in each first area R1 has a smaller cross-sectional area than a part, of conductive wire 28, in the other area, so that the part of conducive wire 28 remaining in each first area R1 works as protective element 34 that limits an overcurrent flowing through conductive wire 28.

To form openings 36 in first areas R1, both of upper-side insulating sheet 30a and lower-side insulating sheet 30b are cut away. Parts of conductive wires 28 and insulating sheet 30 can be formed by performing punching or laser machining on first areas R1, for example. Openings 36 are through-holes extending from one main surface to the other main surface of flexible flat cable 5.

Next, as shown in FIG. 7C, substrates 42 are disposed on openings 36 to apply substrates 42 to protective elements 34. Then, the peripheral edge part of each substrate 42 and insulating sheet 30 are fixed to each other with an adhesive. Through the above steps, protective element-mounted FFC 6 is obtained.

As described above, protective element-mounted FFC 6 according to the present exemplary embodiment includes: the plurality of conductive wires 28; insulating sheet 30 covering the plurality of conductive wires 28; and protective elements 34 disposed in the middle of respective conductive wires 28 to limit overcurrents flowing through conductive wires 28. Protective element 34 of the present exemplary embodiment is a part of conductive wire 28 and is configured with a part having a smaller cross-sectional area than the other part. Also by the above structure, it is possible to reduce occurrence of a short circuit between cells via voltage sense lines and to reduce the cost of the voltage sense lines. Further, the voltage sense lines and battery module 1 can be downsized.

Protective element-mounted FFC 6 further includes substrates 42 that support protective elements 34. This configuration can reduce decrease in strength, of protective element-mounted FFC 6, in the mounting area for each protective element 34. Further, substrates 42 are fixed to insulating sheet 30. This configuration can further improve strength, of protective element-mounted FFC 6, in the mounting area for each protective element 34.

The method for manufacturing protective element-mounted FFC 6 according to the present exemplary embodiment includes: cutting away, in a predetermined area on flexible flat cable 5 including: the plurality of conductive wires 28; and insulating sheet 30 covering the plurality of conductive wires 28, a part of each conductive wire 28 and insulating sheet 30 to make a part of each conductive wire 28 remaining in the predetermined area protective element 34. This method can simplify the manufacturing process of protective element-mounted FFC 6.

In the above, the exemplary embodiments of the present invention have been described in detail. The above-mentioned exemplary embodiments are merely specific examples to practice the present invention. The contents of the exemplary embodiments do not limit the technical scope of the present invention, and many design changes such as change, addition, and removal of configuration elements are possible without departing from the spirit of the invention as defined by the claims A new exemplary embodiment whose design has been changed has both effects of a combined exemplary embodiment and effects of a deformation. In the above-mentioned exemplary embodiments, contents that can be changed in this way are emphasized by the expressions such as "of the present exemplary embodiment" and "in the present exemplary embodiment". However, design can be changed with respect to contents that are not accompanied by such expressions. The combination of the above configuration elements is valid as an aspect of the present invention. The hatching applied to a cross-section of a drawing does not limit the material of the object to which the hatching is applied.

Protective element-mounted FFC 6 according to the above-mentioned exemplary embodiments may be used for uses other than the voltage sense lines. In this case, it is possible to reduce occurrence of a short circuit, between two members that are electrically connected via protective element-mounted FFC 6, through conductive wires 28; and, at the same time, it is possible to reduce cost and to downsize compared with the case of using an FPC that is mounted with protective elements or using electric wires.

In the first exemplary embodiment, laser machining is performed on second areas R2 after punching first areas R1 to expose the tips of conductive wires 28; however, this aspect does not particularly limit the invention. For example, punching or laser machining may be performed simultaneously on first areas R1 and second areas R2 to cut away conductive wires 28 and insulating sheet 30 from first areas R1 and to cut away only insulating sheet 30 from second areas R2. That is, it is possible to combine the step shown in FIG. 5B and the step shown in FIG. 5C into one step.

It is preferable that protective element 34 be provided on all of conductive wires 28, but this configuration does not particularly limit the invention, and protective element 34 only has to be disposed in the middle of at least one of conductive wires 28. Further, cells 8 are prismatic batteries in the above-mentioned exemplary embodiment, but the shape of cells 8 is not particularly limited and may be a cylindrical shape or other shapes. Further, the number of cells 8 included in cell stack 2 is not particularly limited, either.

REFERENCE MARKS IN THE DRAWINGS

1: battery module
2: cell stack
6: protective element-mounted FFC
8: cell
28: conductive wire
30: insulating sheet
34: protective element
36: opening
38: current limiting element
40, 42: substrate

The invention claimed is:

1. A protective element-mounted flexible flat cable comprising:
 a plurality of conductive wires, one of the plurality of conductive wires includes a first portion and a second portion;
 an insulating sheet covering the plurality of conductive wires; and
 a protective element that is disposed between the first portion of the one of the plurality of conductive wires and the second portion of the one of the plurality of conductive wires and is configured to limit an overcurrent flowing through the at least one of the conductive wires,
 wherein the insulating sheet comprises an upper-side insulating sheet disposed above the plurality of conductive wires, and a lower-side insulating sheet disposed below the plurality of conductive wires,
 each of the upper-side insulating sheet and the lower-side insulating sheet includes an opening overlapping the protective element in a thickness direction of the insulating sheet, and
 the protective element includes a current limiting element and a substrate, the substrate disposed below the lower-side insulating sheet,
 wherein the current limiting element is directly disposed on an upper surface of the substrate which is disposed below the lower-side insulating sheet, while the current limiting element is free of direct contact with the upper-side insulating sheet and the lower-side insulating sheet.

2. The protective element-mounted flexible flat cable according to claim 1, wherein the protective element-mounted flexible flat cable constitutes a voltage sense line that is connected to a cell stack having a plurality of stacked cells, wherein the voltage sense line is configured to sense a voltage of each of the stacked cells.

3. The protective element-mounted flexible flat cable according to claim 1, wherein
 the substrate is a printed wiring board attached to a portion of the lower-side insulating sheet which is directly adjacent to the opening defined therein.

4. The protective element-mounted flexible flat cable according to claim 1, wherein
 the current limiting element is connected to the at least one of the conductive wires.

5. The protective element-mounted flexible flat cable according to claim 4, wherein the substrate is fixedly disposed on the insulating sheet.

6. The protective element-mounted flexible flat cable according to claim 1, wherein the protective element is configured with a part of the at least one of the conductive wires, and the part of the at least one of the conductive wires has a smaller cross-sectional area than other part except the part of the at least one of the conductive wires.

7. The protective element-mounted flexible flat cable according to claim 6, wherein the substrate directly supports the part of the at least one of the conductive wires.

8. A battery module comprising:
 a cell stack having a plurality of stacked cells; and
 the protective element-mounted flexible flat cable according to claim 1, the protective element-mounted flexible flat cable constituting a voltage sense line that is configured to sense a voltage of each of the stacked cells.

* * * * *